United States Patent [19]

Yasukatsu

[11] 3,863,267

[45] Jan. 28, 1975

[54] TAPE CARTRIDGE LOCKING AND EJECTING MECHANISM

[75] Inventor: Fujinaka Yasukatsu, Osaka, Japan

[73] Assignee: Matsushita Electric Industrial Co., Ltd., Osaka, Japan

[22] Filed: Mar. 20, 1973

[21] Appl. No.: 343,025

[30] Foreign Application Priority Data

Mar. 25, 1972 Japan .............................. 47-30083

[52] U.S. Cl. .................................. 360/93, 242/198

[51] Int. Cl. ......................... G11b 5/00, G11b 23/04

[58] Field of Search ......... 274/4 B, 4 C, 11 B, 11 C; 242/198; 779/100.2 Z; 352/74

[56] References Cited

UNITED STATES PATENTS 3,684,299 8/1972 Clark .................................. 274/4 B

*Primary Examiner*—Leonard D. Christian
*Attorney, Agent, or Firm*—Wenderoth, Lind & Ponack

[57] ABSTRACT

A tape cartridge locking and ejecting mechanism for use in a cartridge-type tape player for firmly locking the cartridge received in the cartridge receiving chamber in position ready to be reproduced by a sound reproducing head and for automatically or manually ejecting the cartridge, after having been played, without permitting the cartridge to unnecessarily dash out of the player is disclosed. To this end, the locking and ejecting mechanism includes an actuating member having a finger engageable with the front of the inserted cartridge, an operating lever for operating the actuating member in response to movement of a link member which is in turn coupled with a solenoid armature. The operating lever is pulled by a tension spring which acts, when the cartridge is to be ejected, to provide an obstruction to the pivotal movement of the actuating member.

6 Claims, 4 Drawing Figures

TAPE CARTRIDGE LOCKING AND EJECTING MECHANISM

Figure 1:
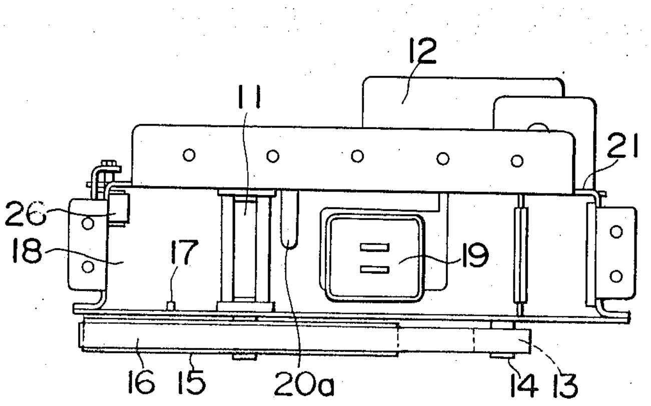

The present invention relates to a cartridge locking and ejecting mechanism and, more particularly, to such a mechanism for use in a cartridge-type tape player.

One exemplary type of automatic device for firmly positioning the cartridge within the cartridge receiving chamber of the player with the tape reliably engaged to the sound reproducing head and for ejecting the cartridge from the player after it has been played is disclosed in U.S. Pat. No. 3,485,500 patented on Dec. 23, 1969. According to this U.S. patent, the locking and ejecting mechanism essentially comprises a pivotally supported bell crank having a projection or finger downwardly extending into the tape cartridge receiving chamber for engagement with the front of the cartridge, and a pivotally supported and substantially U-shaped arm member having one end engageable with said bell crank for operating the latter and a portion adjacent to the other end thereof being connected with a solenoid armature by means of an overcenter spring.

In this arrangement, when the cartridge is not inserted in the cartridge receiving chamber of the player, the solenoid armature is in rearwardly retracted position without circumferentially compressing the overcenter spring, in which condition the U-shaped arm member is pivoted in one direction with the first mentioned end of said arm member causing the bell crank to be placed in a first stable position. When the cartridge is inserted subsequently in the cartridge receiving chamber, the front of the cartridge engages the downwardly extending projection or finger of the bell crank thereby causing the latter to be positioned in a second stable position. As said bell crank pivots to the second stable position, the U-shaped arm member is permitted to correspondingly pivot in the opposite direction thereby causing the overcenter spring to be circumferentially compressed. Upon completion of the circumferential compression of the overcenter spring, the U-shaped arm member is further pivoted in said opposite direction while the solenoid armature is frontwardly projected, both by the snap action of said overcenter spring. The tape cartridge is, at this time, firmly locked in position within the cartridge receiving chamber.

After the tape cartridge has been played, and upon simultaneous or subsequent energization of the solenoid to position the solenoid armature in the rearwardly retracted position, the overcenter spring is again circumferentially compressed until it has passed the overcenter point. After the spring has passed the overcenter point, the U-shaped arm member is suddenly pivoted in said one direction by the snap action of said overcenter spring, and the bell crank is correspondingly rapidly pivoted to the initial or first stable position, thereby ejecting the tape cartridge out of the cartridge receiving chamber.

In such a conventional cartridge-type tape player, though the locking and ejecting mechanism functions satisfactorily, it has been found that some problem is still left unsolved. More specifically, when the cartridge in the cartridge receiving chamber is to be ejected out of said chamber, the bell crank is considerably rapidly pivoted to the first stable position through the U-shaped arm member by the snap action of the overcenter spring as hereinbefore described and, by this reason, the cartridge is often dashed out of the cartridge receiving chamber and, if the cartridge-type tape player is installed in an atuomotive vehicle, it may fall onto the floor. This obviously involves possibilities of damage both to the vehicle driver and/or passengers on the automotive vehicle and to the tape cartridge itself.

It may be contemplated to provide in the player of the above construction means for preventing the cartridge from being suddenly ejected from the player, the provision of which will result in increase of the manufacturing costs and complexity of the tape player.

Accordingly, an essential object of the present invention is to provide an improved cartridge locking and ejecting mechanism for use in the cartridge-type tape player that utilizes relatively few parts and is easily assembled with substantial elimination of the above mentioned disadvantages and inconveniences inherent in the prior art player of a similar kind.

Another object of the present invention is to provide an improved cartridge locking and ejecting mechanism for use in the cartridge-type tape player that can be automatically operated.

A further object of the present invention is to provide an improved cartridge locking and ejecting mechanism for use in the cartridge-type tape player, which operates not only to firmly and reliably hold the inserted cartridge in position within the cartridge receiving chamber, but also to moderately eject the cartridge, after having been played, without permitting the cartridge to unnecessarily project from the cartridge receiving chamber.

According to one preferred embodiment of the present invention, the locking and ejecting mechanism essentially comprises an actuating member of substantially V-shaped configuration pivotally mounted on the player and normally biased in one direction about the pivot by a spring member, said actuating member having one end integrally formed with a finger downwardly extending into the cartridge receiving chamber for engagement with the front of the cartridge being inserted, an operating lever of substantially arch shaped configuration having one end engageable with the other end of said actuating member and the other end pivotally mounted on the player, and a link having one end engageable with said operating member and the other end pivotally coupled to the solenoid armature. The operating lever tends to pivot in one direction due to a tension spring, but, unless otherwise the cartridge is inserted in the cartridge receiving chamber, said operating lever is maintained in position biased against the pulling force of the tension spring by the engagement between the free end thereof and the other end of said actuating member.

In the above arrangement, since the resiliency of the spring member acting on the acutating member and the pulling force of the tension spring acting on the operating lever are cancelled with respect to each other during insertion of the tape cartridge into the cartridge receiving chamber, the insertion of the cartridge into said chamber only requires a relatively slight external force to be applied to the cartridge entering said chamber. Furthermore, when the cartridge once inserted is to be ejected, nothing obstructs the pivotal movement of the actuating member by the action of the spring member. However, partly because this spring member does not provide the snap action and partly because the resiliency of this spring member is slightly greater than a force necessary to move the cartridge in the cartridge receiving chamber, the tape cartridge in the cartridge receiving chamber does not dash out of said chamber.

Figure 2:
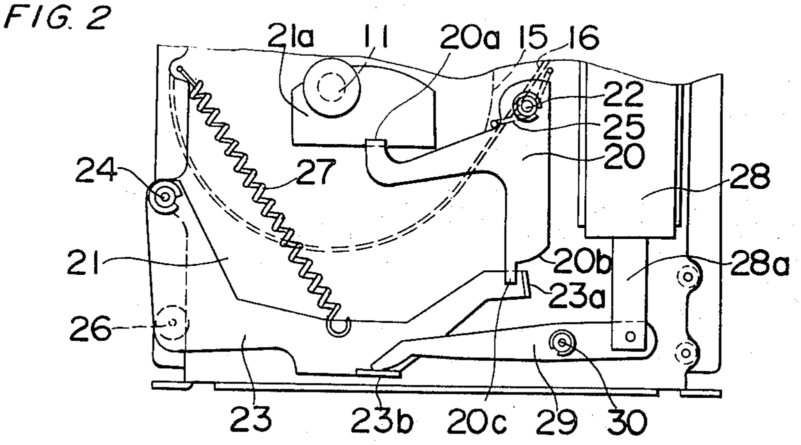
Figure 3:
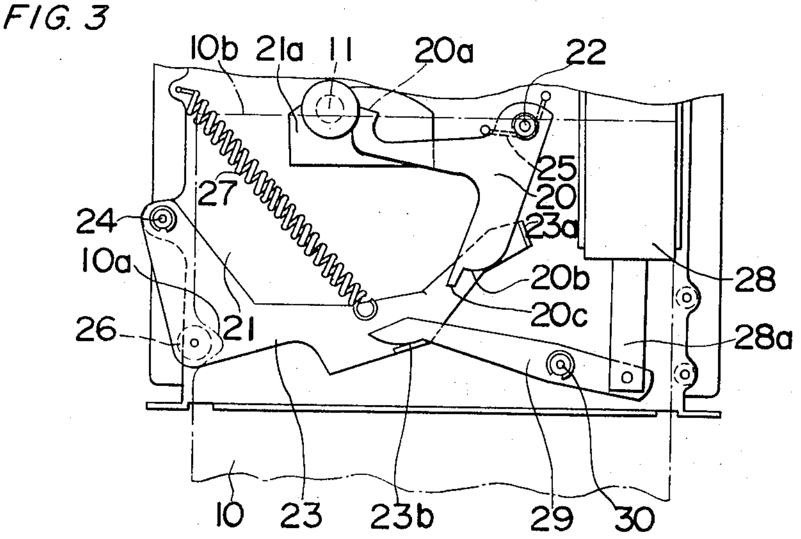
Figure 4:
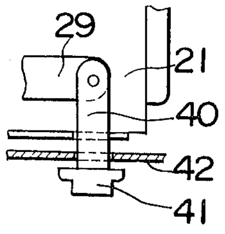

These and other objects and features of the present invention will become apparent from the following description taken in conjunction with preferred embodiments thereof with reference to the accompanying drawings, in which;

FIG. 1 is a front elevational view schematically showing the tape player to which the present invention is applied, FIG. 2 is a partially top plan view of FIG. 1, showing one preferred embodiment of the present invention, FIG. 3 is a view similar to FIG. 2, showing a tape cartridge in position in the device, and FIG. 4 is a partially top plan view of a portion of the mechanism, showing another preferred embodiment of the present invention.

Before the description of the present invention proceeds, it is to be noted that like parts are designated by like reference numerals throughout the accompanying drawings.

Referring now to the drawings, FIG. 1 shows a tape player apparatus adapted to receive and play tape cartridges such as indicated by 10 in FIG. 3 and having a multi-track tape therein which is positioned to be engaged by the capstan 11 to drive the tape through the cartridge 10. An electric motor 12 drives a pulley 13 rigidly mounted on a drive shaft 14 of said motor 12 and connected with the capstan flywheel 15 coaxial with the capstan 11 through an endless belt 16. A miniature switch 17 is responsive to the placing of the cartridge 10 in the cartridge receiving chamber 18 of the tape player to operate the motor 12. A magnetic tape reproducing head 19 is mounted within the player apparatus in such a known manner that said magnetic head 19 is stepwisely shiftable in the direction perpendicular to the direction of drive of the tape for selection of a particular one of the tracks on the tape.

The arrangement so far described is of a conventional construction and well understood by those skilled in the art and, therefore, the details thereof are herein omitted for the sake of brevity.

Disposed on the top plate 21 of the tape player is a tape cartridge locking and ejecting mechanism which includes an actuating member 20 pivotally mounted on said top plate 21 by a shaft 22 and having one end formed into a finger 20*a*, which downwardly extends through an opening 21*a*, formed in the top plate 21, into the cartridge receiving chamber 18 as clearly shown in FIG. 1, the other end of which is formed integrally with a cam edge as at 20*b* and a projection 20*c* adjacent to said cam edge 20*b*. This actuating member 20 is pivotable about the shaft 22 thereby to cause the finger 20*a* to move between first and second positions, and is normally biased in one direction about said shaft 22 by a coil spring 25 such as to maintain the finger 20*a* in the first position as shown in FIG. 1, said coil spring having a pair of ends; one of which is fixed to the top plate 21 and the other end engaged to the end portion of said member 20 adjacent to said finger 20*a*.

The mechanism further includes an operating lever 23 of substantially arch-shaped configuration having one end portion pivotally mounted on the top plate 21 by a shaft 24 and the other end formed with an engagement 23*a* engageable with said cam edge 20*b* and said projection 20*c* of said actuating member 20 in a manner as will be described later. This operating lever 23 is formed at a substantially intermediate portion with an upwardly extending projection 23*b*, the function of which will be mentioned later, and carries a roller 26 partially collapsible into the cartridge receiving chamber 18 in response to the pivotal movement of said operating lever 23 for engagement in a V-shaped groove or slot 10*a* formed in the cartridge 10 as commercially standardized. As is well known to those skilled in the art, this roller 26 is adapted, when engaged in the V-shaped groove 10*a* in the cartridge 10, to lock the latter in position with the tape ready to be reproduced by the magnetic head 19.

To enable the cartridge 10 to be locked in position by means of the roller 26, a tension spring 27 is disposed between a substantially intermediate portion of the operating lever 23 and a fixed portion on the top plate 21 so that said operating lever 23 tends to pivot in one direction with the roller 26 ready to engage in said V-shaped groove 10*a*, while the engagement 23*a* of said lever 23 is engaged by the projection 20*c* of said actuating member 20. Alternatively, this tension spring 27 may be disposed between said intermediate portion of said operating lever 23 and the end portion of said actuating member 20 adjacent to said finger 20*a*, in which case the provision of the coil spring 22 may be omitted.

A solenoid unit 28 is rigidly mounted on the top plate 21 and has a solenoid armature 28*a* movable between retracted and projected positions, a free end of said solenoid armature 28*a* being pivotally coupled to one end of a link member 29. This link member 29 is pivotally mounted on the top plate 21 by a shaft 30 at a substantially intermediate portion thereof, the other end of which is engageable with the upwardly extending projection 23*b* for operating said operating lever 23 in response to the movement of said armature 28a to said retracted position.

Instead of the employment of the solenoid unit 28 including the armature 28*a*, a push-button type actuator may be provided as shown in FIG. 4. In FIG. 4, the push-button type actuator includes a connecting rod 40 having one end pivotally connected with that end of the link member 29 and the other end rigidly provided with a button 41, a substantially intermediate portion of which slidably extends through a wall 42 forming a part of the structure to which the tape player is installed. In this arrangement of FIG. 4, a single push applied to the button 41 is sufficient to eject the tape cartridge 10 within the cartridge receiving chamber 18.

In the case where the solenoid unit 28 is employed as shown in FIGS. 2 and 3, it may be electrically coupled with a circuit means for bring the solenoid armature 28*a* to the retracted position thereby to eject the tape cartridge 10 automatically upon completion of performance of the tape cartridge by the player. Alternatively, it may be coupled in series with a power source through a switch in such a manner that, when an operator closes said switch, the armature 28*a* is immediately brought into the retracted position thereby to eject the tape cartridge within the cartridge receiving chamber 18.

Operation of the cartridge locking and ejecting mechanism constructed as hereinbefore described in accordance with the present invention will be described hereinafter in detail with reference to FIGS. 2 and 3.

The locking and ejecting mechanism is initially in the condition as shown in FIG. 2. When the tape cartridge 10 is inserted into the chamber 18, it moves in a direction towards the rear of the player until the front 10*b* of said cartridge 10 strikes the finger 20*a*. Continued movement of the cartridge 12 in engagement with the finger 20*a* with a relatively slight external force applied to said cartridge 10 from the rear causes the actuating member 20 to pivot the shaft 22 against the coil spring 25. As said actuating member 20 pivots with the finger 20*a* approaching the second position, the engagement 23*a* of the operating lever 23 slides over the cam edge 20*b* in contact therewith, thereby causing the operating lever 23 to pivot about the shaft 24 pulled by the tension spring 27. During the sliding movement of the engagement 23*a* along the cam edge 20*b*, the tension spring 27 acts not only to pivot the operating lever 23 in the manner as hereinbefore described, but also to apply a pushing force to said actuating member 20 through the engagement 23*a* in contact with the cam edge 20*b*, whereby a relatively great external force is no longer required to insert the cartridge 10 into the receiving chamber 18.

Simultaneously therewith, the link member 29 is pivoted about the shaft 30 with the free end thereof in engagement with the upward projection 23*b* of the operating lever 23. As said link member 29 is thus pivoted, the solenoid armature 28*a* is brought to the projected position.

At the time of completion of insertion of the cartridge 10 into the cartridge receiving chamber 18 of the player, the locking and ejecting mechanism is conditioned as shown in FIG. 3. In this condition, the roller 26 has been already engaged in the V-shaped groove 10*a* of the cartridge 10 thereby to firmly lock the latter in position with the tape ready to be reproduced by the sound reproducing head 19.

After the tape cartridge 10 has been played, the link member 29 is pivoted in the opposite direction to the direction of pivot thereof during the insertion of the cartridge 10 into the chamber 18. This is effected by operating the solenoid unit 28 so as to project the solenoid armature 28*a* or by depressing the push-button type actuator of FIG. 4.

As said link member 29 pivots in said opposite direction, the free end thereof in engagement with the upward projection 23*a* of the operating lever 23 pushes the projection 23*a* thereby causing the operating lever 23 to pivot about the shaft 24 in the opposite direction with the roller 26 disengaging from the V-shaped groove 10*a* against the tension spring 27. At this time, the engagement 23*a* of the operating lever 23 is apparently tending to disengage from the cam edge 20*b* of the actuating member 20. However, this engagement 23*a* acts in practice to obstruct a sudden pivot of the actuating member 20 which may otherwise occur if the engagement 23*a* of the operating lever 23 immediately disengages from the cam edge 20*b*.

In other words, even though the operating lever 23 pivots against the tension spring 27 with the engagement 23a tending to disengage from the cam edge 20*b*, the contact between said engagement 23*a* and said cam edge 20*b* is constantly maintained by the reason that the actuating member 20 is urged to pivot about the shaft 22 by the coil spring 25 until the finger 20*a* arrives at the initial or first position as shown in FIG. 2 while the engagement 23*a* engages the projection 20*c* of the actuating member 23. A similar procedure is observable even in the case where the tension spring 27 is bridged between the operating lever 23 and the actuating member 20 without employment of the coil spring 25.

From the foregoing, it has now become clear that the cartridge 10 inserted in the cartridge receiving chamber 18 and having been played is ejected in such a manner that the speed of movement of said cartridge 10 in the opposite direction towards the front of the player is substantially governed by the speed of shift of the finger 20*a* from the second position to the first position. In other words, the cartridge 10 having been played is moderately ejected without vigorously dashing out of the player.

Although the present invention has been fully disclosed by way of the preferred embodiments thereof, it is to be noted that various changes and modifications are apparent to those skilled in the art. Therefore, unless otherwise they depart from the true scope of the present invention, they should be construed as included therewithin.

What is claimed is:

1. An apparatus for use in a sound reproducing device using an interchangeable tape cartridge to be accommodated in a cartridge receiving chamber of the sound reproducing device comprising:

a pivotally supported first member operatively positioned and having one end formed with a finger extending into said cartridge receiving chamber, said first member being pivotable between first and second positions;

means coupled to said first member for biasing said first member to said first position, said first member being capable of pivoting to said second position against said biasing means upon insertion of said cartridge into said cartridge receiving chamber with the front thereof engaging against said finger;

a pivotally supported second member having one end pivotally connected to the chassis of the sound reproducing device and a second end engageable with said first member, said second member being pivotable between first and second positions;

means operatively positioned for urging said second member to move to said second position, said movement of said second member to said second position thereof by the action of said urging means occuring in response to the movement of said first member to said second position thereof with said second end of said second member in sliding engagement with said first member;

a roller rotatably carried by said second member adjacent said first end of said second member and being capable of collapsing into a V-groove formed in said cartridge for holding said cartridge in position within said cartridge receiving chamber when said roller engages in said V-groove; and a pivotally supported third member operatively positioned and having a pair of opposed ends, one end being engageable with said second member and the other end adapted to receive an external pushing force, said third member, when receiving said external pushing force, causing said first and second members to be positioned at said first respective positions thereof by the action of said biasing and urging means while said finger, when said first member pivots towards the first position thereof, ejects the cartridge in readiness for removal thereof from the sound reproducing device.

2. An apparatus as claimed in claim 1 wherein said means for urging said second member is comprised of a tension spring having one end connected to the chassis of the reproducing apparatus and the other end connected to said second member.

3. An apparatus as claimed in claim 1 wherein said biasing means comprises a coil spring mounted on a pin member used for pivotally securing said first member to the chassis of the reproducing apparatus, said coil spring having one end connected to said chassis and the other end engaged to said first member.

4. An apparatus as claimed in claim 1 wherrein said biasing means and said urging means comprises a single tension spring having one end connected to said first member and the other end connected to said second member.

5. An apparatus as claimed in claim 1, further comprising a solenoid unit having a solenoid armature pivotally coupled to said second end of said third member for applying the external pushing force exerted by the movement of said solenoid armature.

6. An apparatus as claimed in claim 1, further comprising an actuator having a connecting rod and an operating member accessible to an operator, said connecting rod extending between said operating member and said second end of said third member for applying the external pushing force to said third member when the operator operates said operating member.

* * * * *

UNITED STATES PATENT OFFICE

CERTIFICATE OF CORRECTION

Patent No. 3,863,267 Dated January 28, 1975

Inventor(s) Yasukatsu FUJINAKA

It is certified that error appears in the above-identified patent and that said Letters Patent are hereby corrected as shown below:

The name of the inventor should be correctly shown as Yasukatsu FUJINAKA, rather than Fujinaka Yasukatsu.

Signed and sealed this 29th day of April 1975.

(SEAL)
Attest:

RUTH C. MASON
Attesting Officer

C. MARSHALL DANN
Commissioner of Patents and Trademarks